(12) United States Patent
Kobayashi et al.

(10) Patent No.: US 7,117,844 B2
(45) Date of Patent: Oct. 10, 2006

(54) CONNECTING STRUCTURE BETWEEN ROTARY SHAFT AND METAL PLATE AND METHOD OF CONNECTING THEREBETWEEN

(75) Inventors: Masayuki Kobayashi, Tomobe (JP); Koji Harada, Hitachinaka (JP); Keiichi Uraki, Hitachinaka (JP); Yuki Ejiri, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/948,756

(22) Filed: Sep. 24, 2004

(65) Prior Publication Data

US 2005/0120998 A1 Jun. 9, 2005

(30) Foreign Application Priority Data

Sep. 26, 2003 (JP) ............................. 2003-336291

(51) Int. Cl.
*F02D 9/08* (2006.01)
*F02D 1/00* (2006.01)

(52) U.S. Cl. ..................... 123/337; 123/399; 29/525

(58) Field of Classification Search ............... 123/337, 123/399, 361; 29/525, 893.1, 893.2, 451
See application file for complete search history.

(56) References Cited

U.S. PATENT DOCUMENTS

| 4,377,762 A | 3/1983 | Tatsumi et al. | |
| 5,716,156 A | 2/1998 | Bayer et al. | |
| 6,382,181 B1 * | 5/2002 | Wayama et al. | 123/399 |
| 6,694,947 B1 * | 2/2004 | Wayama et al. | 123/399 |
| 2003/0172905 A1 | 9/2003 | Wayama et al. | |
| 2003/0196640 A1 * | 10/2003 | Saito et al. | 123/399 |
| 2005/0178359 A1 * | 8/2005 | Wayama et al. | 123/399 |

FOREIGN PATENT DOCUMENTS

| JP | 05-200475 | 8/1993 |
| JP | 09-250627 | 9/1997 |
| JP | 11-192567 | 7/1999 |

* cited by examiner

*Primary Examiner*—John T. Kwon
(74) *Attorney, Agent, or Firm*—Crowell & Moring LLP

(57) ABSTRACT

In a connecting structure between a rotary shaft and a metal plate and a method of connecting them together, in which the metal plate can be joined to the rotary shaft with a high degree of accuracy with high strength at a low manufacturing cost without causing eccentricity, inclination, or the like as far as possible, a large-diameter shaft portion and a small-diameter shaft portion are connected to each other with a predetermined difference in diameter so as to form therebetween a shoulder surface perpendicular to an axis of rotation, plural stripes of coining indents extending in a direction of shaft length are formed on the outer peripheral surface of the small-diameter shaft portion, a circular-shaped mount hole adapted to be fitted onto the small-diameter shaft portion is formed in the metal plate, the mount hole of the metal plate is press-fitted onto the small-diameter shaft portion so as to be subjected to plastic deformation by the coining indents, a portion surrounding the mount hole on one side surface of the metal plate is pushed against the shoulder surface, and the outer peripheral surface of the small-diameter shaft portion and the mount hole of the metal plate are joined together by laser welding or the like.

16 Claims, 9 Drawing Sheets

CONNECTING STRUCTURE BETWEEN ROTARY SHAFT AND METAL PLATE AND METHOD OF CONNECTING THEREBETWEEN

BACKGROUND OF THE INVENTION

The present invention relates to a connecting structure, in which a rotary shaft, such as a valve shaft or the like, supporting, for example, a throttle valve, and a metal plate constituting a gear or the like are fixedly connected to each other so as to be able to rotate together, and a connecting method therefor.

For example, JP-A-11-192567 (pages 1 to 8, and FIGS. 1 to 11) describes, as a known technique of joining a rotary shaft and a metal plate together, a method, in which a large-diameter shaft portion (central shaft) and a small-diameter shaft portion (projecting shaft portion) are connected to each other with a step therebetween so as to define a shoulder surface orthogonal to a central axis, a circular fitting hole fitted therein the small-diameter shaft portion is formed on the metal plate, the fitting hole of the metal plate is then fitted onto the small-diameter shaft portion, and then the metal plate and the shoulder surface are joined together by means of laser welding.

JP-A-9-250627 (pages 1 to 10, and FIGS. 1 to 7) describes a connecting structure between a shaft and a metal plate, in which diameter-enlarging streaks are formed on an end port of a rotary shaft (drive shaft) to project from an outer peripheral surface of the shaft while, a shaft mounting hole is formed on a metal plate (pulley), the shaft mounting hole is press-fitted onto the end port of the rotary shaft so as to cause plastic deformation by the diameter enlarging streaks while an outer periphery of the tip end of the rotary shaft is reinforcement-welded to the shaft mounted hole.

Further, JP-A-5-200475 (pages 1 to 4, and FIGS. 1 to 11) describes a method of manufacturing a rotary shaft, in which a molding die is used to form swaged streaks (raised portions) on an outer periphery of the rotary shaft to enable a pulley, a rotor, a commutator, a fan, etc. to be fixedly connected thereto.

By the way, in the case where the connecting structure described above is applied for joining a rotary shaft to a metal plate, such as gears, pulleys, sprocket wheels, etc., in order to transmit a rotational drive force of a motor or the like to the rotary shaft, for example, joining between a valve shaft (rotary shaft) in an electrically controlled throttle device, to which a throttle valve is to be mounted, and a throttle gear (metal plate) joined to the valve shaft in order to permit transmission of a rotational drive force of a motor to the valve shaft, the metal plate is always exerted by a force in a direction of shaft length (direction along an axis of rotation) in addition to a force in a direction of rotation and is frequently applied with a repeated load so that it is necessary to ensure a sufficient joining strength between the rotary shaft and the metal plate. Thus it is demanded to ensure coaxiality and orthogonality between the both elements with a high degree of accuracy.

With the connecting method described in the JP-A-11-192567, however, the metal plate and the shoulder surface on the shaft are joined together by means of laser welding, so that inclination of the metal plate relative to the shaft is restricted. Thus the method cannot be applied other than a very thin (thickness is 1 mm or less) metal plate although orthogonality is achieved to some extent. Also, there is caused a problem that a gap (clearance) is ordinarily defined between the small-diameter shaft portion (projecting shaft portion) and the fitting hole to result in eccentricity of the metal plate (or its fitting hole) relative to the shaft, so that satisfactory coaxiality cannot be obtained. In this case, it may decrease the gap in order to improve coaxiality, but it is necessary to control an outside diameter of the rotary shaft (its small-diameter shaft portion) and an inside diameter of the hole of the metal plate with high accuracy, resulting in an increase in cost.

On the other hand, with the connecting structures described in JP-A-9-250627 and JP-A-5-200475, when the hole (the shaft mounted hole, the mount hole) on the metal plate (pulley or the like) is press-fitted onto the rotary shaft, the diameter enlarging streaks or the swaged streaks bite into the hole to subject the same to plastic deformation (scraped), so that a gap defined between the rotary shaft and the hole is substantially absorbed whereby eccentricity of the metal plate (its hole) relative to the shaft is restricted and sufficient coaxiality can be obtained. However, in the case where a sheet (having a thickness of, for example, 3 mm or less) having a large wall thickness portion such as a boss or the like is used as the metal plate, this connecting structures cannot be practically used because the metal plate tends to incline relative to the rotary shaft (orthogonality can hardly be obtained) unless the portion around the hole in the metal plate is fairly large in thickness (length in a direction along the axis of rotation).

The present invention is devised in order to solve the problems described above and an object of the present invention is to provide a connecting structure between a rotary shaft and a metal plate and a method of connecting them together, in which the metal plate can be joined to the rotary shaft with a high degree of accuracy and high strength at a low cost without generating eccentricity, inclination, or the like as far as possible.

Further object of the invention is to provide an electrically controlled throttle device which is reasonably applied thereto with the connecting structure.

BRIEF SUMMARY OF THE INVENTION

In order to attain the above mentioned object, in an embodiment of the invention, there is provided a connecting structure between a rotary shaft and a metal plate, wherein the rotary shaft is composed of a large-diameter shaft portion and a small-diameter shaft portion which are connected to each other with a predetermined difference in diameter therebetween, plural stripes of swaged streaks extending in a direction of shaft length are formed on the outer peripheral surface of the small-diameter shaft portion, a mount hole adapted to be fitted onto the small-diameter shaft portion is formed on the metal plate, the mount hole of the metal plate is press-fitted onto the small-diameter shaft portion so as to be subjected to plastic deformation by the swaged streaks, and the outer peripheral surface of the small-diameter shaft portion and the mount hole of the metal plate are joined together by laser welding or the like.

According to a further embodiment of the invention, there is provided a connecting structure wherein a rotary shaft is composed of a large-diameter shaft portion and a small-diameter shaft portion are connected to each other with a predetermined difference in diameter therebetween in order to define a shoulder surface of orthogonal to the unit of the rotary shaft, plural stripes of swaged streaks extending in a direction of shaft length are formed on the outer peripheral surface of the small-diameter shaft portion, a circular-shaped mount hole adapted to be fitted onto the small-diameter shaft portion is formed in a metal plate, the mount hole of the metal plate is press-fitted on the small-diameter shaft portion so as to be subjected to plastic deformation by the swaged streaks, a portion surrounding the mount hole on one side surface of the metal plate is pushed against the shoulder surface, and the outer peripheral surface of the small-diameter shaft portion and the mount hole of the metal plate are joined together by laser welding or the like.

In this case, according to a preferred embodiment, an axial length of the small-diameter shaft portion is not smaller than a thickness of a portion around the mount hole on the metal plate.

According to a further preferred embodiment, a bore diameter of the mount hole is somewhat larger than an outside diameter of the small-diameter shaft portion, and a height of the swaged streaks projected from the outer peripheral surface, is set to be larger than a gap defined between the mount hole and the small-diameter shaft portion.

The plural stripes of swaged streaks are preferably formed so as to be laterally and vertically symmetric, the small-diameter shaft portion is preferably provided on one end side of the rotary shaft, and according to a still further preferred embodiment, a power transmission port such as gear teeth or the like may be provided on an outer periphery of the metal plate.

According to a more specific preferred embodiment, the portion around the mount hole on the metal plate has a thickness of not larger than 3 mm, and a height, by which the swaged streaks are projected from the outer peripheral surface, ranges from 0.08 to 0.3 mm.

A still further preferred embodiment of the invention provides a connecting structure between a stepped rotary shaft composed of first and second small-diameter shaft portions and first and second metal plates wherein, the first small-diameter shaft portion is connected to one end side of a large-diameter shaft portion with a predetermined difference in diameter so as to define therebetween a first shoulder surface orthogonal to the axis of the rotary shaft, and the second small-diameter shaft portion having a diameter smaller than that the first small-diameter shaft portion is connected to one end side of the first small-diameter shaft portion with a predetermined difference in diameter so as to define therebetween a second shoulder surface orthogonal to the axis of the rotary shaft, and the first and second metal plates are formed therein with first and second circular-shaped mount holes, which are fitted onto the first and second small-diameter shaft portions, respectively, and wherein the first and second small-diameter shaft portions are formed on their outer peripheral surfaces with plural axially extending stripes of first and second swaged streaks, the first and second mount holes are their press-fitted onto the first and second small-diameter shaft portions so as to be subjected to plastic deformation by the first and second swaged streaks, portions surrounding the first and second mount holes on one side surfaces of the first and second metal plates are pushed against the first and second shoulder surface, respectively, and the outer peripheral surfaces of the first and second small-diameter shaft portions and the first and second mount holes, respectively, are joined together by laser welding or the like.

On the other hand, in a preferred embodiment of the invention, there is provided an electrically controlled throttle device, wherein the connecting structure is used to connect a valve shaft as the rotary shaft, to which a throttle valve is mounted, to a throttle gear as the metal plate, in orders to transmit a rotational drive force of a motor or the like to the valve shaft.

Also, in a further preferred embodiment of the invention, there is provided an electrically controlled throttle device, wherein the connecting structure is used to connect a valve shaft as the rotary shaft, to which a throttle valve is mounted, to a driving bracket as the metal plate, which is a component of a throttle sensor for detection of a throttle position.

Further, in a further preferred embodiment of the invention, there is provided an electrically controlled throttle device, wherein the connecting structure is used to connect a valve shaft as the rotary shaft, to which a throttle valve is mounted, to a throttle gear as the first metal plate, so as to transmit a rotational drive force of a motor or the like to the valve shaft, and also to connect the valve shaft and a driving bracket as the second metal plate being joined to the valve shaft, which is component of a throttle sensor for detection of a throttle position.

In this case, the throttle sensor may be either of a contact type or of a non-contact type.

Also, in a preferred embodiment of the invention, there is provided a method of connecting between a rotary shaft and a metal plate, comprising the steps of connecting a large-diameter shaft portion and a small-diameter shaft portion so as to form the rotary shaft with a predetermined difference in diameter, forming plural stripes of swaged streaks extending in a direction of shaft length on an outer peripheral surface of the small-diameter shaft portion, forming a mount hole, which is to be fitted on the small-diameter shaft portion, in the metal plate, press-fitting the mount hole of the metal plate onto the small-diameter shaft portion so as to subject the same to plastic deformation by the swaged streaks, and thereafter joining the outer peripheral surface of the small-diameter shaft portion and the mount hole of the metal plate together by laser welding or the like.

Further, in a further preferred embodiment of the invention, there is provided a method of connecting between a rotary shaft and a metal plate, comprising the steps of connecting a large-diameter shaft portion to a small-diameter shaft portion so as to constitute the rotary shaft with a predetermined difference in diameter in order to form therebetween a shoulder surface perpendicular to an axis of the rotary shaft, forming plural stripes of swaged streaks extending in a direction of shaft length on the outer peripheral surface of the small-diameter shaft portion, forming a circular-shaped mount hole in the metal plate, which is to be fitted onto the small-diameter shaft portion, on the metal plate, press-fitting the mount hole of the metal plate onto the small-diameter shaft portion so as to subject the same to plastic deformation by the swaged streaks, pressing a portion surrounding the mount hole on one side surface of the metal plate against the shoulder surface, and thereafter joining the outer peripheral surface of the small-diameter shaft portion and the mount hole of the metal plate together by laser welding or the like.

With the connecting structure between a rotary shaft and a metal plate, and the connecting method according to the invention, when the mount hole of the metal is press-fitted onto the small-diameter shaft portion of the rotary shaft, the swaged streaks formed on the outer peripheral surface of the small-diameter shaft portion bite into the mount hole (its inner peripheral surface) to subject the mount hole to plastic deformation (scoring), so that a gap defined between the small-diameter shaft portion and the mount hole is substantially absorbed whereby eccentricity of the mount hole of the metal plate relative to the rotary shaft is restricted and sufficient coaxiality is obtained. Also, since a portion surrounding the mount hole on one side surface of the metal plate is pushed against the shoulder surface formed on the rotary shaft, the metal plate can hardly incline relative to the rotary shaft (it is likely to obtain orthogonality) even when the portion about the mount hole on the metal plate is small in thickness (length in a direction along the axis of the rotary shaft), thus enabling the connecting structure to be used in the case where a sheet (having a thickness of, for example, not larger than 3 mm) has no a thick wall portion such as a boss or the like.

With the connecting structure and the connecting method according to the invention, a sufficient joining strength (in the direction of rotation and the direction of shaft length) can be obtained because sufficient coaxiality and orthogonality are obtained by causing the swaged streaks to bite into the mount hole and pressing the portion surrounding the mount hole on one side surface of the metal plate against the shoulder surface formed on the rotary shaft, and then the outer peripheral surface of the small-diameter shaft portion and the mount hole of the metal plate are joined together by laser welding or the like.

Also, even when the gap defined between the small-diameter shaft portion and the mount hole is not so small, the outside diameter of the small-diameter shaft portion and an inside diameter of the mount hole are not precisely adjusted, it is possible to reduce the manufacturing cost.

Further, in the case of fixedly connecting the metal plate to the rotary shaft at a predetermined angle (posture), it has been conventionally necessary to use a specific tool to position and fix the metal plate during laser welding. On the contrary with the connecting structure and the connecting method according to the invention, the metal plate is tacked on the rotary shaft by press-fitting the metal plate onto the rotary shaft at a predetermined angle (posture), so that precise positioning and holding of the metal plate are not required during laser welding, thereby it is possible to further reduce the cost.

Other objects, features and advantages of the invention will become apparent from the following description of the embodiments of the invention taken in conjunction with the accompanying drawings.

DETAILED DESCRIPTION OF THE PREFERRED EMBODIMENTS

An embodiment of the invention will be described below with reference to the drawings.

Figure 1:
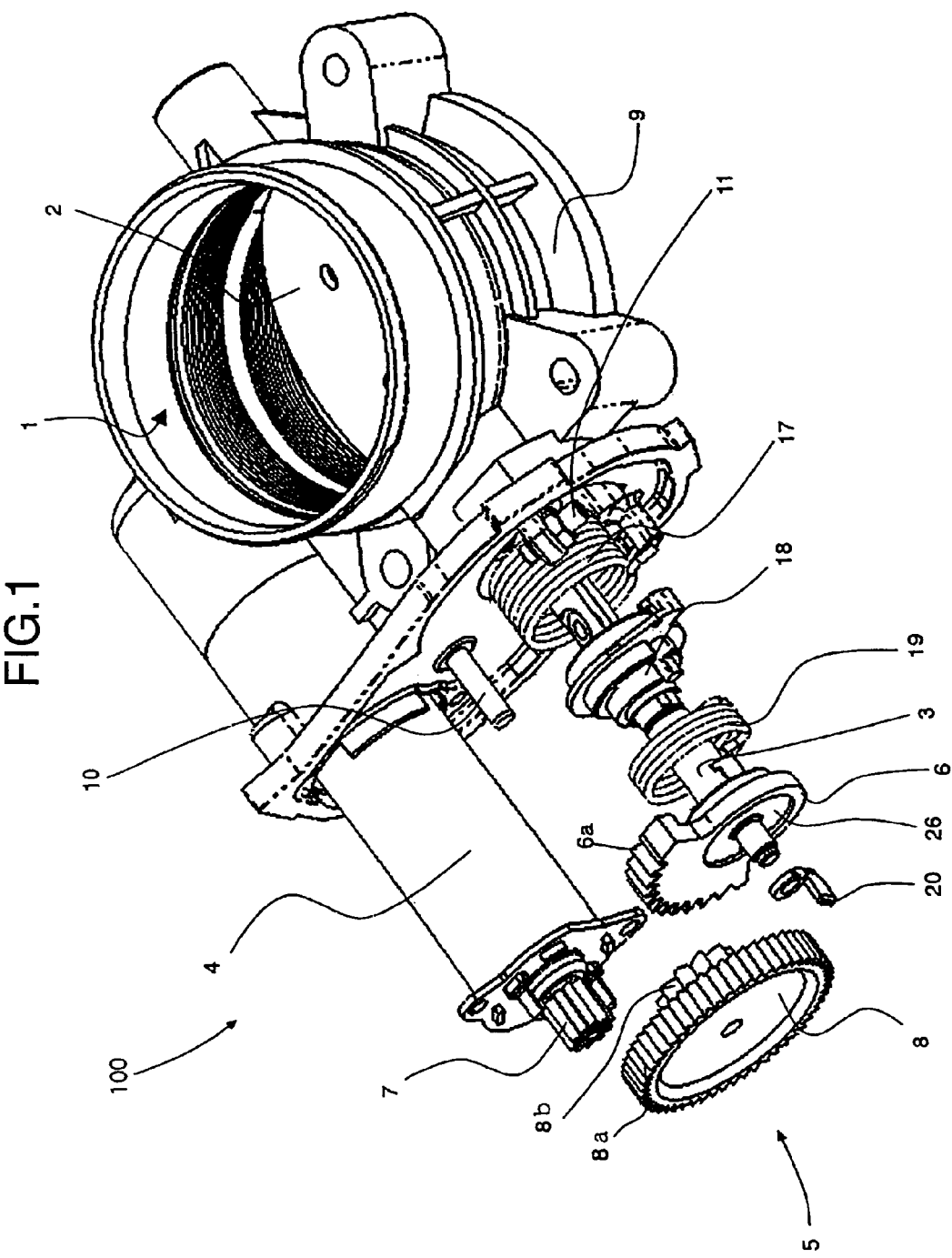
FIG. 1 is an exploded, perspective view showing an electrically controlled throttle device, to which an embodiment of a connecting structure between a rotary shaft and a metal plate, according to the invention, is applied, with a gear cover being removed.
Figure 2:
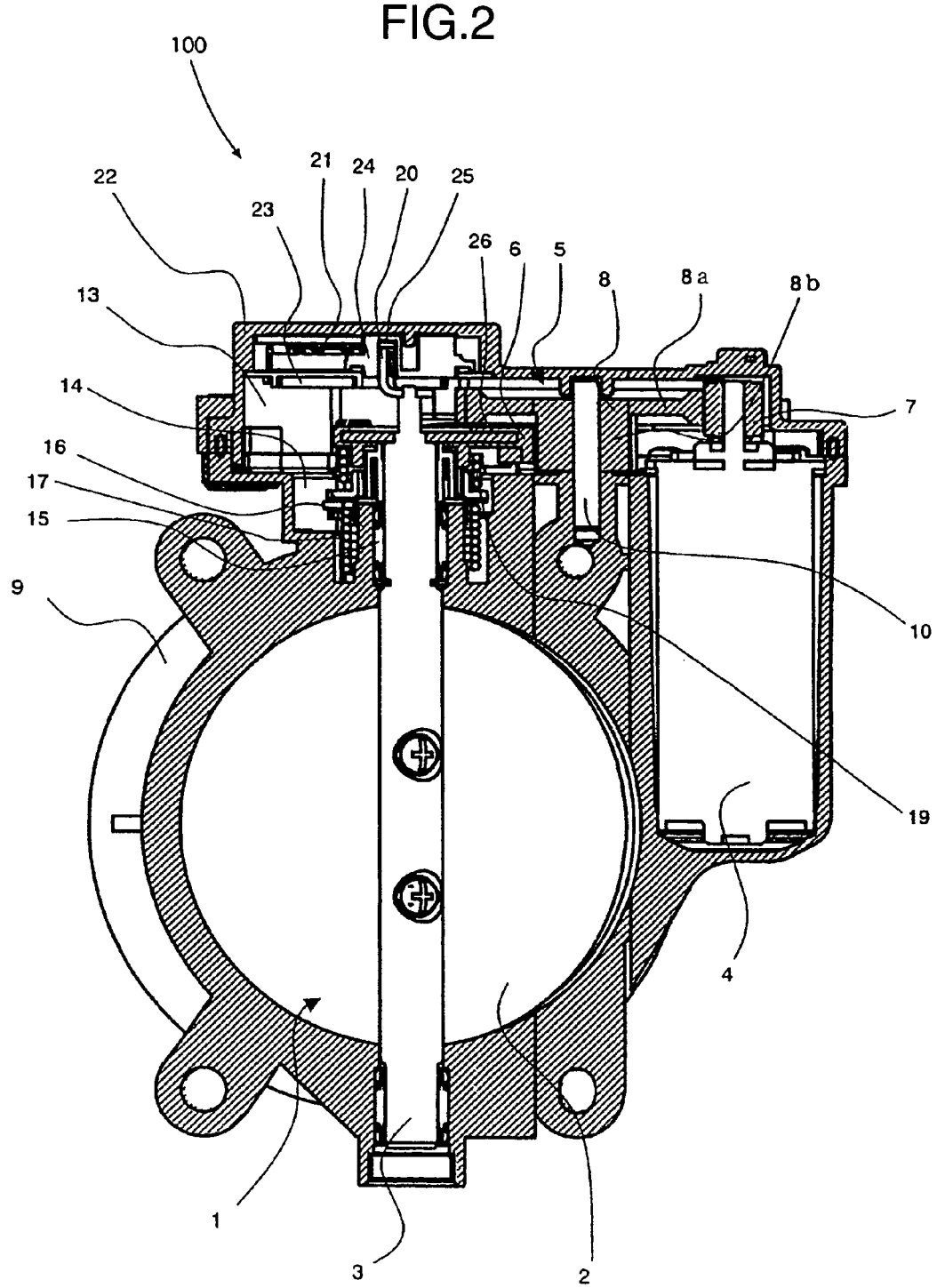
FIG. 2 is a cross-sectional view showing the electrically controlled throttle device shown in FIG. 1, cutting along a plane orthogonal to an intake passage and through the axis of a rotary valve shaft.
Figure 3:
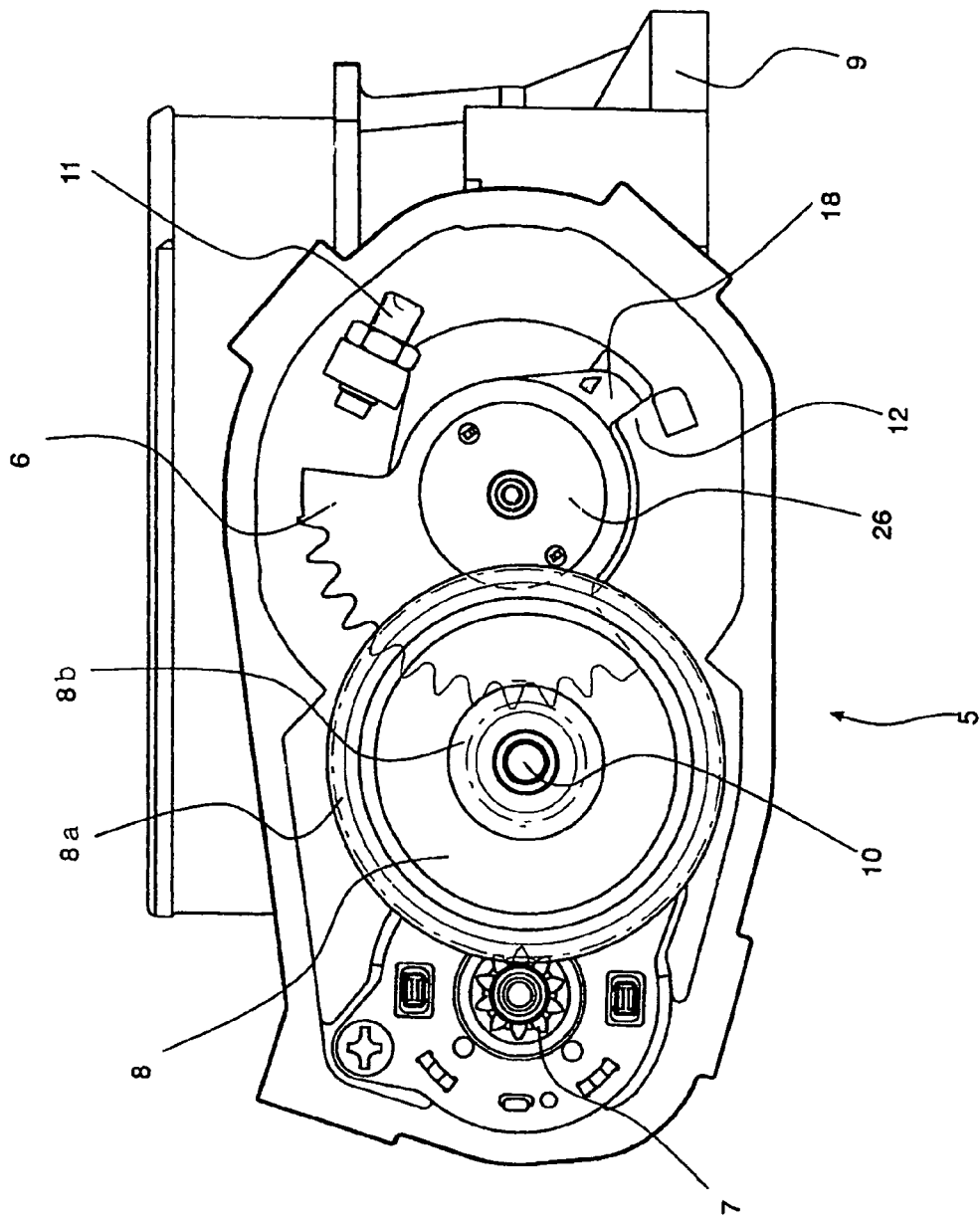
FIG. 3 is a side view showing a gear mounting portion of the electrically controlled throttle device shown in FIG. 1 with the gear cover being removed.

FIG. 1 is an exploded, perspective view showing an electrically controlled throttle device, to which an embodiment of a connecting structure between a rotary shaft and a metal plate, according to the invention, is applied, with a gear cover being removed, FIG. 2 is a view showing a cross section of the electrically controlled throttle device of FIG. 1 cutting along a plane perpendicular to an intake passage and through an axis of rotation of a valve shaft, and FIG. 3 is a side view showing a gear mounting portion of the electrically controlled throttle device of FIG. 1 with the gear cover being removed.

A quantity of an air flowing in an intake passage 1 is regulated according to the opening degree of a disk-shaped throttle valve 2 in the electrically controlled throttle device shown in FIGS. 1, 2 and 3. The throttle valve 2 is fixed to a valve shaft 3 as a rotary shaft by screwing. Mounted on one end of the valve shaft 3 is a final-stage gear (which will be hereinbelow referred to as throttle gear) 6 of a reduction gear mechanism 5 that transmits a rotational drive force from motor (electrically-driven actuator) 4 to the valve shaft 3.

The reduction gear mechanism 5 comprises a pinion gear 7 mounted on the motor 4, and an intermediate gear 8 in addition to the throttle gear 6. The intermediate gear 8 comprises a large-diameter gear portion 8a meshing with the pinion gear 7, and a small-diameter gear portion 8b meshing with the throttle gear 6, and is rotatably fitted on a gear shaft 10 fixed to a wall surface of a throttle body 9.

The motor 4 is driven in accordance with an accelerator signal representative of a degree of depressor of an accelerator pedal, and a traction control signal, and a power from the motor 4 is transmitted to the valve shaft 3 consecutively via the gears 7, 8, 6. The throttle gear 6 is composed of a gear plate 26 formed of a disk-shaped metal plate fixedly connected (press fitted) to the valve shaft 3 by a connecting structure according to the embodiment, and a sector-shaped gear portion (teeth portion) 6a made of resin and fixed (press-fitted) to an outer periphery of the gear plate 26.

A fully closing stopper 11 is provided to define a mechanically fully closed position of the throttle valve 2, the fully closing stopper 11 comprising an adjustable screw provided to the throttle body 9, and accordingly, when the throttle valve 2 is turned to the mechanically fully closed position in a closing direction, one end of a stopper latch element (which the throttle gear 6 serves as in this case) fixed to the valve shaft 3 abuts against the stopper 11 to prevent the throttle valve 2 from being closed (turned) further.

A stopper (also, referred to as a reset stopper) 12 for setting a reset opening degree serves to maintain an opening degree of the throttle valve 2 upon turning off an engine key (when the electrically-driven actuator 4 is turned off) that is a predetermined initial opening degree (reset opening degree), which is larger than the mechanically fully closed position and an electrically fully closed position (a minimum opening degree in control).

A gear mounting space 13 accommodating therein the gear mechanism 5 is formed in a side wall of the throttle body 9, a deep recess 14 part is defined in the gear mounting space 13, and a bearing boss 16 accommodating therein one of bearings 15 on the valve shaft 3 is provided in the deep recess port 14 thus formed.

After mounting of a return spring 17, a reset lever 18, a reset spring 19, and the throttle gear 6, an angle-shaped driving bracket 20 (one of metal plates to be fixedly connected to the valve shaft 3 in the connecting structure according to the embodiment) made of a metal plate is mounted to one end of the valve shaft 3. In this embodiment, the return spring 17 and the reset spring 19 are compressed, having a relationship between compressive stresses F, f (F>f), are compressed after press-fitting the throttle gear 6.

A throttle sensor 21 and the reduction gear mechanism 5 are arranged in a bundle on one surface of the side wall of the throttle body 9. The throttle sensor 21 serves to detect an opening degree (throttle position) of the throttle valve, and a throttle sensor and associated components, i.e., all components except the valve shaft 3 are incorporated inside of the gear cover 22 so as to be covered by a sensor cover 23 as shown in FIG. 2.

Figure 4:
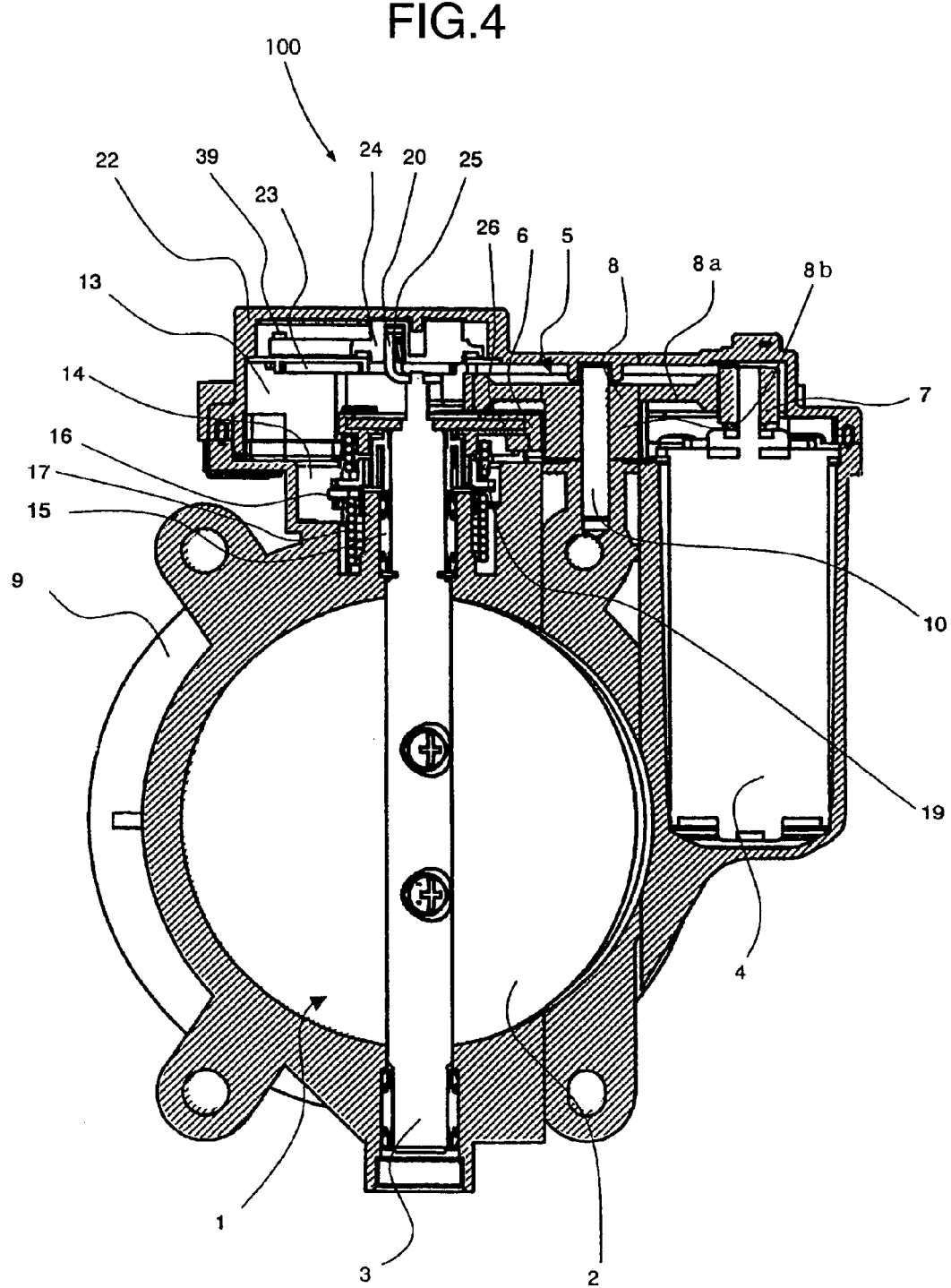
FIG. 4 is a cross sectional view showing an electrically controlled throttle valve in which a non-contact type throttle sensor is used in stead of a contact type throttle sensor shown in FIG. 2.

While the throttle sensor 21 shown in FIG. 2 is of a contact type, a non-contact type throttle sensor 39 can be used instead thereof, as shown in FIG. 4.

The driving bracket 20 as one of components of the throttle sensor 21 (39) which is fixedly connected to the valve shaft 3 is configured so as to extend up to a position of a rotor 24 of the throttle sensor 21 after mounting of the gear cover 22, and to be automatically fitted into a rotor shaft hole 25 exposed to the sensor cover 23 when the gear cover 22 is mounted on the throttle body 9.

In the electrically controlled throttle device 100 constructed in the manner described above, the connecting structure according to the embodiment is used for the fixed connection of the valve shaft 3 and the throttle gear 6 (the gear plate 26 thereof), and the fixed connection of the valve shaft 3 and the driving bracket 20.

The connecting structure and the connecting method according to the embodiment will be described below in detail.

FIGS. 5A to 5D show the consecutive steps in a manufacturing process of the valve shaft 3.

Figure 5:
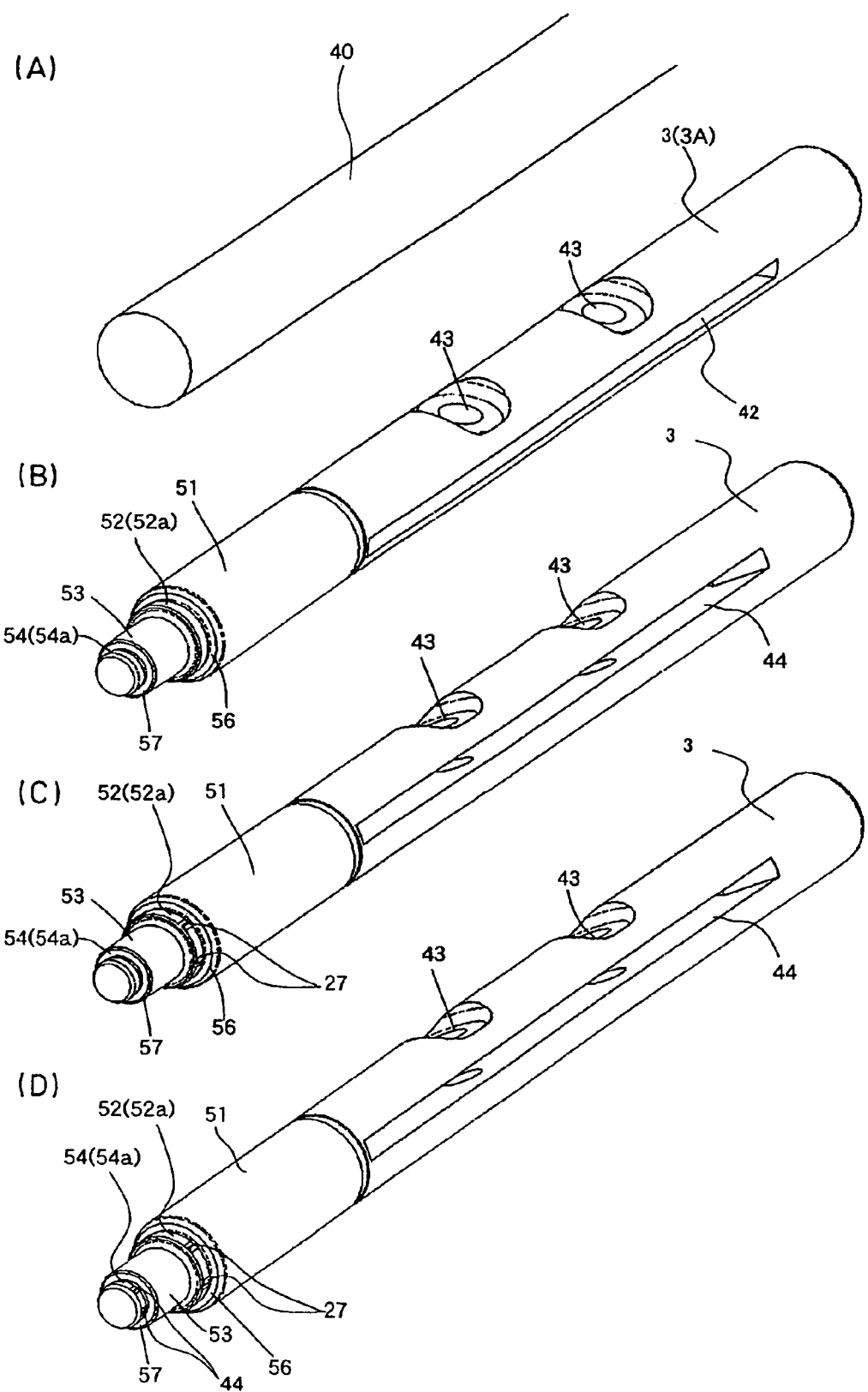
FIGS. 5A to 5D are views showing a manufacturing process of a valve shaft of the electrically controlled throttle device.

The valve shaft 3 is manufactured as follows: a blank 40 which is a round bar made of free-cutting stainless steel shown in FIG. 5A is worked so that a through-slot 42 for mounting the throttle valve 2, set-screw passing holes 43, etc. are formed on a spindle portion 3A as shown in FIG. 5B, a large-diameter shaft portion 51 having substantially the same diameter as that of the spindle portion 3A and a first small-diameter shaft portion 52 having a smaller diameter than that of the large-diameter shaft portion 51 are formed contiguous to each other on one end side of the spindle portion 3A with a predetermined difference in diameter so as to define therebetween a first shoulder surface 56 orthogonal to the axis of the rotary shaft (central axis), an intermediate large-diameter shaft portion 53 having a smaller diameter than that of the first small-diameter shaft portion 52 is formed on one end side of the first small-diameter shaft portion 52, and a second small-diameter shaft portion 54 having a smaller diameter than that of the intermediate large-diameter shaft portion 53 is formed contiguous to the intermediate large-diameter shaft portion 53 on one end side thereof with a predetermined difference in diameter so as to define therebetween a second shoulder surface 57 orthogonal to the axis of the rotary shaft.

Next, as shown in FIG. 5C, plural stripes of swaged streaks 27 are formed on the outer peripheral surface 52a of the first small-diameter shaft portion 52 in a direction of shaft length (a direction along the axis of the rotary shaft) by means of the SF working (swaging or the like) with the use of forming dies 30 shown in FIG. 8 (described later in detail), and plural stripes of swaged streaks 44 are formed on the outer peripheral surface 54a of the second small-diameter shaft portion 54 in the direction of shaft length (a direction along the axis of rotation) by means of the SF working as shown in FIG. 5D (which will be described later in detail).

Figure 7:
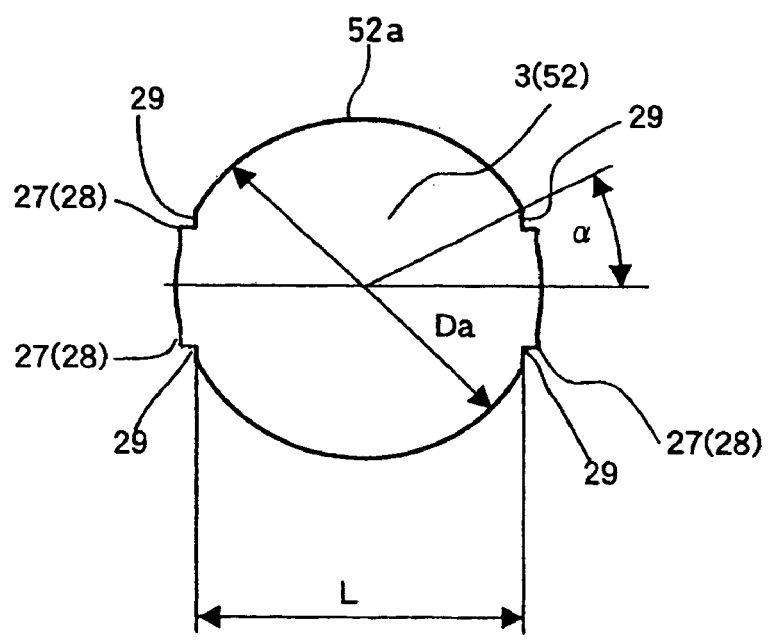
FIG. 7 is an enlarged, cross sectional view showing a first small-diameter shaft portion on the valve shaft.
Figure 8:
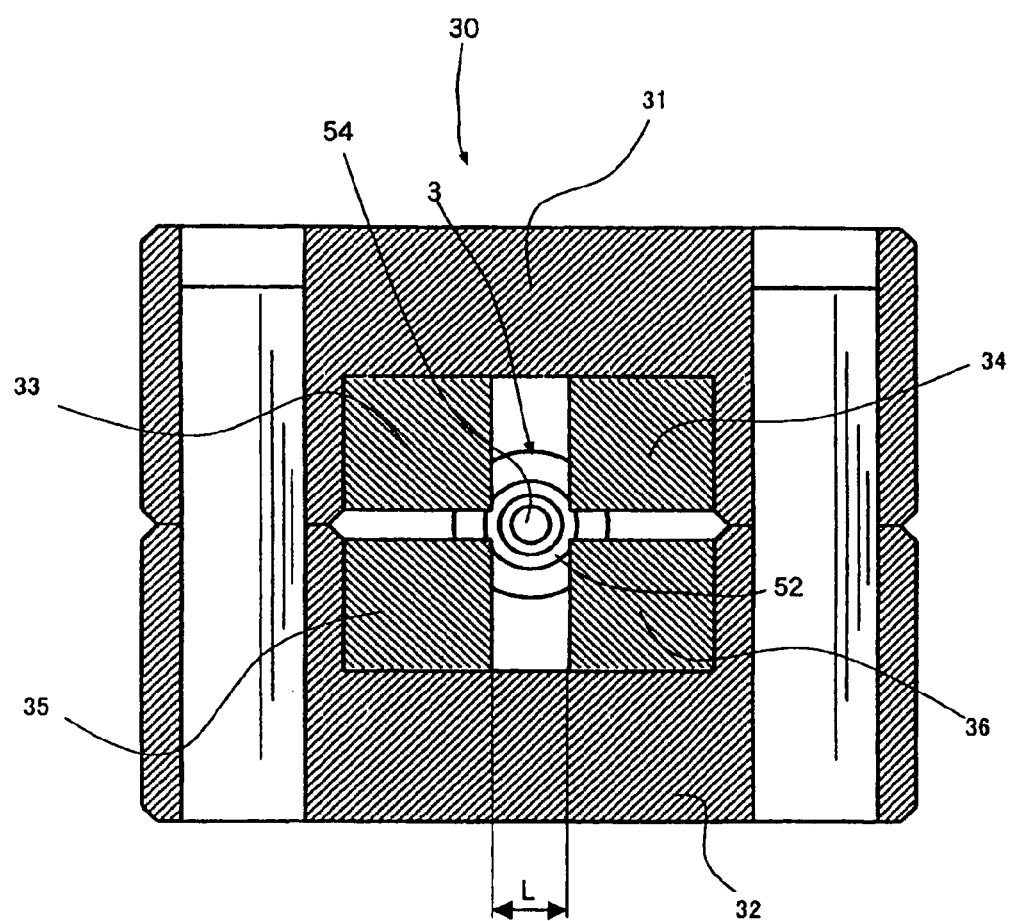
FIG. 8 is a cross sectional view showing an example of molding dies for forming swaged streaks on the first small-diameter shaft portion of the valve shaft.

The forming dies 30 shown in FIG. 8 comprises upper and lower dies 31, 32, and pairs of die blades 33, 34, 35, 36 are fixed to inside corners of the upper and lower dies 31, 32 with a spacing L somewhat narrower than an outside diameter Da (see FIG. 7) of the first small-diameter shaft portion 52 therebetween by means of screwing or the like. In this case, the spacing L is prescribed by L=Da·cos α where α is a die blade pressing range, in which the die blades are pushed, is set to about 25° in view of formability of the swage streaks 27 and the strength of joining. During forming the swage streaks 27, after the first small-diameter shaft portion 52 of the valve shaft 3 is placed between the die blades 33, 34, 35, 36, a vertical load is applied to the shaft portion by means of, for example, a hydraulic press. Thereby, four stripes of swaged streaks 27 are formed laterally and vertically symmetric at a time.

Figure 6:
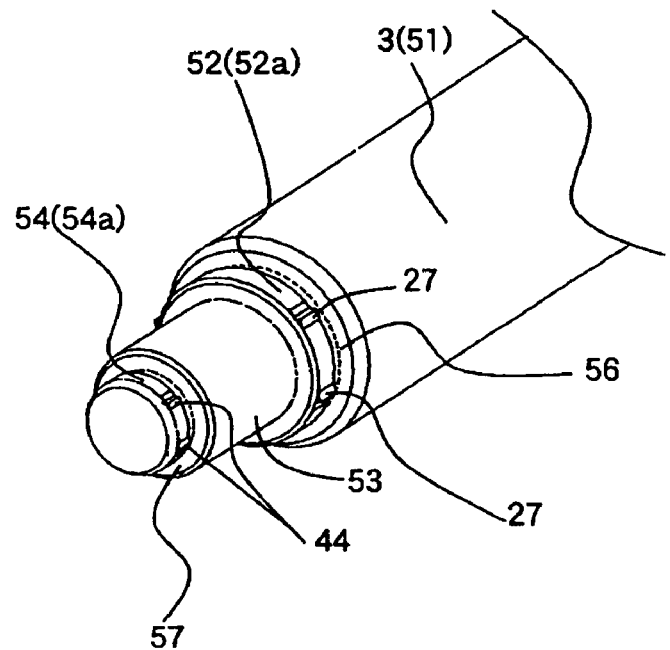
FIG. 6 is an enlarged, perspective view showing an end of the valve shaft.

The swaged streaks 27 thus formed on the first small-diameter shaft portion 52 comprise ridges 28 projecting slightly (about 0.1 mm) from the outer peripheral surface 52a (basic circle=outside diameter Da) of the first small-diameter shaft portion 52 and notched grooves 29 as seen from FIGS. 6 and 7. The swaged streaks 44 on the second small-diameter shaft portion 54 are formed similar to the swaged streaks 27. In addition, the swaged streaks 27, 44 are shown in the figures being somewhat exaggerated.

Figure 9:
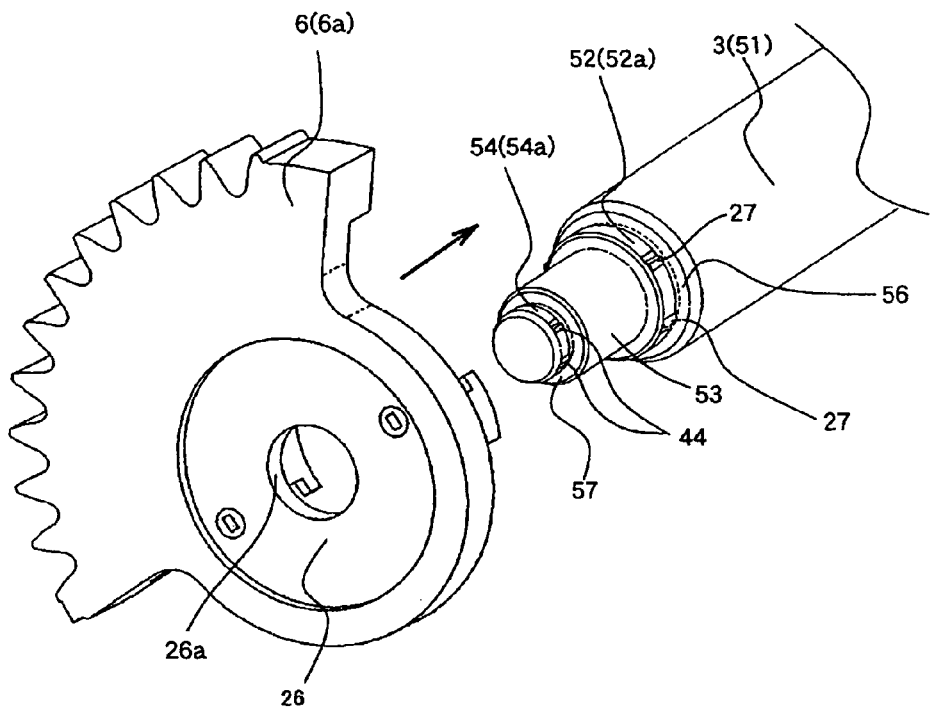
FIG. 9 is a view for explaining an embodiment of the connecting structure and the connecting method according to the invention.
Figure 11:
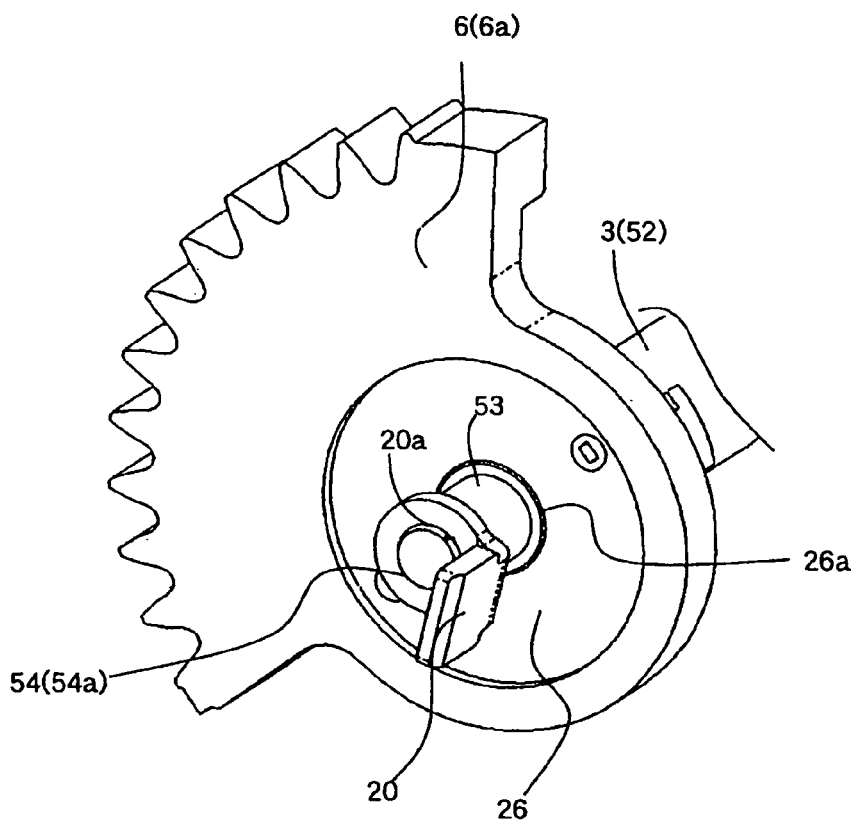
FIG. 11 is a view for explaining an embodiment of the connecting structure and the connecting method according to the invention.

On the other hand, the gear plate 26 (having an outside diameter of 26 mm) of the throttle gear 6 is formed in its central port with a first mount hole 26a, which is adapted to be fitted on the first small-diameter shaft portion 52 with a predetermined gap (5 to 35 μm), as shown in FIG. 9, and the driving bracket 20 is also formed with a circular-shaped second mount hole 20a, which is adapted to be fitted on the second small-diameter shaft portion 54 with a predetermined gap (5 to 35 μm), as shown in FIG. 11.

The first small-diameter shaft portion 52 and the second small-diameter shaft portion 54 have axial lengths which are not less than thicknesses (about 2 mm) of the gear plate 26 and the driving bracket 20 (in the portions around the first mount hole 26a and the second mount hole 20a).

Figure 10:
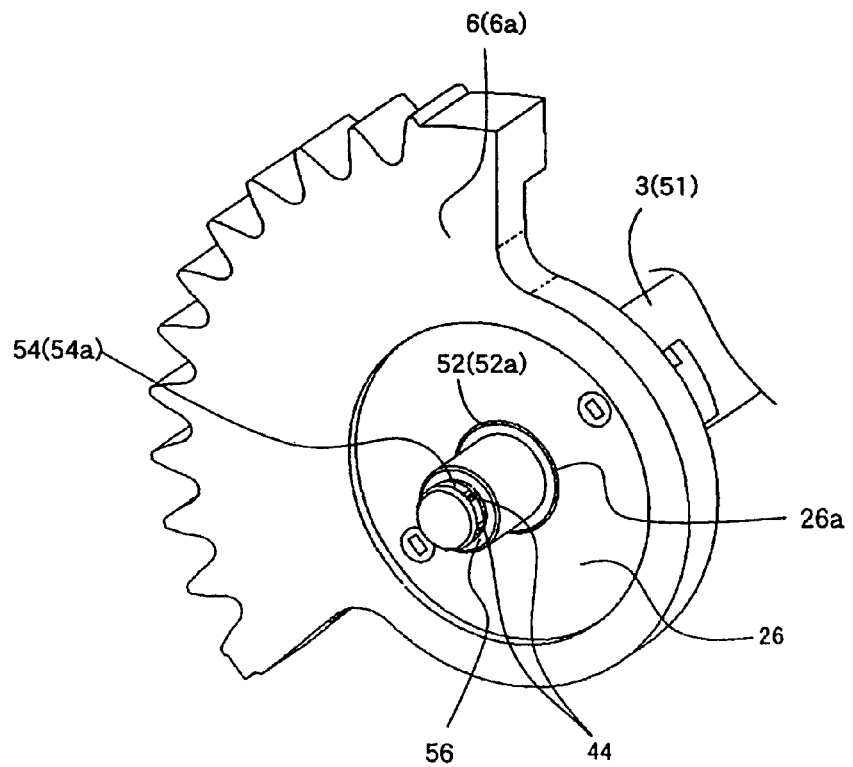
FIG. 10 is a view for explaining an embodiment of the connecting structure and the connecting method according to the invention.

With such structure, the first mount hole 26a formed in the gear plate 26 of the throttle gear 6 is press-fitted on the first small-diameter shaft portion 52 so as to be subjected to plastic deformation (scoring) by the swaged streaks 27 as shown in FIGS. 9 and 10, and after a portion surrounding the mount hole 26a on one side surface of the gear plate 26 is pushed against the shoulder surface 56, the outer peripheral surface 52a of the small-diameter shaft portion 52 and the mount hole 26a are joined together by laser welding (over the entire periphery thereof).

Likewise, the second mount hole 20a formed on the driving bracket 20 is press-fitted onto the second small-diameter shaft portion 54 so as to be subjected to plastic deformation (scoring) by the swaged streaks 44 as shown in FIG. 11, and after a portion surrounding the mount hole 20a on one side surface of the driving bracket 20 is pushed against the shoulder surface 57, the outer peripheral surface 54a of the small-diameter shaft portion 54 and the mount hole 20a are joined together by laser welding (over the entire periphery).

With the connecting structure and the connecting method in this embodiment, when the mount holes 26a, 20a of the gear plate 26 and the driving bracket 20 are press-fitted onto the small-diameter shaft portions 52, 54 of the valve shaft 3, the swaged streaks 27, 44 formed on the outer peripheral surfaces 52a, 54a of the small-diameter shaft portions 52, 54 bite into the mount holes 26a, 20a (their inner peripheral surfaces) to subject the mount holes 26a, 20a to plastic deformation (scoring), so that gaps defined between the small-diameter shaft portions 52, 54 and the mount holes 26a, 20a are substantially absorbed whereby eccentricity of the mount holes 26a, 20a relative to the small-diameter shaft portions 52, 54 can be restricted and sufficient coaxiality can be obtained. Also, since portions surrounding the mount holes 26a, 20a on one side surfaces of the gear plate 26 and the driving bracket 20 are pushed against the shoulder surfaces 56, 57 formed on the valve shaft 3, the gear plate 26 and the driving bracket 20 can hardly incline relative to the valve shaft 3 (it is likely to obtain orthogonality) even when the portions around the mount holes on the gear plate 26 and the driving bracket 20 are small in thickness (length in a direction along the axis of rotation), thus enabling the connecting structure to be used in the case where a sheet (having a thickness of, for example, not larger than 3 mm) having a thick wall portion such as a boss or the like is used.

With the connecting structure and the connecting method in this embodiment, a sufficient joining strength (in the direction of rotation and the direction of shaft length) can be obtained because sufficient coaxiality and orthogonality are obtained by allowing the swaged streaks 27, 44 to bite into the mount holes 26a, 20a and pressing the portions surrounding the mount holes 26a, 20a against the shoulder surfaces 56, 57, and then the outer peripheral surfaces 52a, 54a of the small-diameter shaft portions 52, 54 and the mount holes 26a, 20a are joined together by laser welding.

Also, even when the gaps defined between the small-diameter shaft portions 52, 54 and the mount holes 26a, 20a are not so small, it is unnecessary to control outside diameters of the small-diameter shaft portions 52, 54 and inside diameters of the mount holes 26a, 20a with a high degree of accuracy, thereby it is possible to reduce the cost.

Further, in the case of connecting and fixing the gear plate 26 and the driving bracket 20 to the valve shaft 3 at a predetermined angle (posture), it has been conventionally necessary to use specific tools to position and fix these elements during laser welding but with the connecting structure and the connecting method according to the embodiment, the gear plate 26 and the driving bracket 20 are tacked held on the small-diameter shaft portions 52, 54 of the valve shaft 3 by press-fitting the gear plate 26 and the driving bracket 20 onto the small-diameter shaft portions 52, 54 of the valve shaft 3 at predetermined angles (postures), so that it is unnecessary to position and fix these elements during laser welding, thereby it is possible to reduce the cost.

Figure 12:
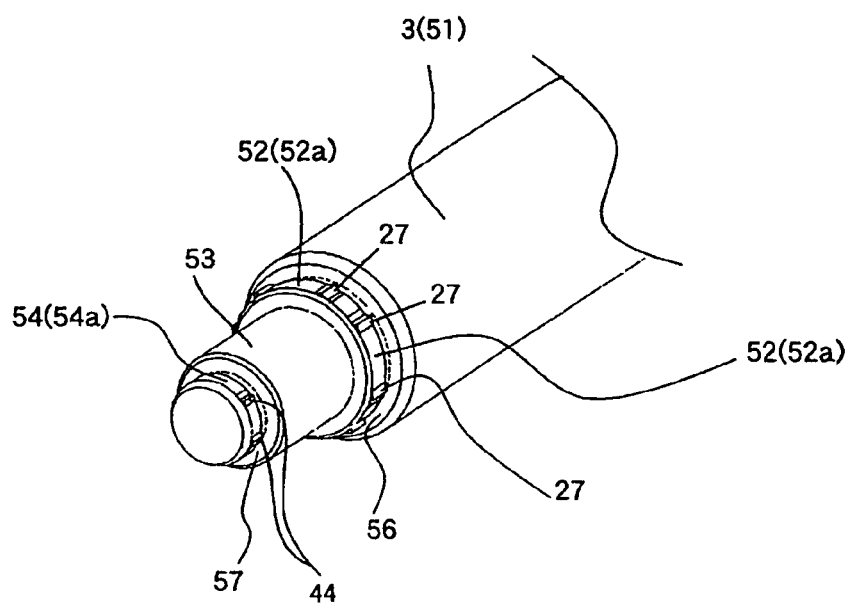
FIG. 12 is an enlarged, perspective view showing an end port of a valve shaft in order to explain a further embodiment of the connecting structure according to the invention.

While it has been explained that the swaged streaks 27 in this embodiment are formed at four locations on the outer peripheral surface of the small-diameter shaft portion 52, the present invention should not be limited thereto but the swaged streaks 27 may be formed evenly in eight locations, for example, in such a manner that the swaged streaks 27 are formed first at four locations as described above, and thereafter by rotating the valve shaft 3 by 90°, additional streaks are similarly formed at four locations (see FIG. 12).

For example, in the case where the small-diameter valve shaft 3 has an outside diameter of 6 mm and the swages streaks 27 have a projecting height of 0.1 mm, the torsion resisting torque amounts to 4.5 N·m when the swaged streaks 27 are provided at four locations, while the torsion resisting torque of 8.3 N·m can be ensured in the case where the swaged streaks 27 are provided at eight locations, whereby only the swaged streaks 28 can bear a torsional torque, so that it is unnecessary to perform laser welding over an entire periphery and it suffices to perform laser welding in spots for prevention of coming-off.

While the preferred embodiment of the invention has been described in detail, the invention is not limited to this preferred embodiment but various modifications in design can be made within a scope of the invention without departing from the spirit of the invention described in the claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A connecting structure between a rotary shaft having a center axis and a metal plate, wherein the rotary shaft is composed of a large-diameter shaft portion and a small-diameter shaft portion which are connected to each other with a predetermined difference in diameter so as to define therebetween a shoulder surface orthogonal to the center axis, plural stripes of swaged streaks extending in a direction of shaft length are formed on an outer peripheral surface of the small-diameter shaft portion through plastic deformation by applying a load to the outer peripheral surface, a mount hole adapted to be fitted onto the small-diameter shaft portion is formed in the metal plate, the mount hole of the metal plate is press-fitted onto the small-diameter shaft portion so as to be subjected to plastic deformation by the swaged streaks the metal plate being pushed again the shoulder surface, and the outer peripheral surface of the small-diameter shaft portion and the mount hole of the metal plate are joined by laser welding.

2. The connecting structure according to claim 1, wherein an axial length of the small-diameter shaft portion is not less than a thickness of the portion around the mount hole on the metal plate.

3. The connecting structure according to claim 1, wherein a bore diameter of the mount hole is somewhat larger than an outside diameter of the small-diameter shaft portion, and a height of the swaged streaks projecting from the outer peripheral surface, is larger than a gap defined between the mount hole and the small-diameter shaft portion.

4. The connecting structure according to claim 1, wherein the plural stripes of swaged streaks are formed so as to be laterally and vertically.

5. The connecting structure according to claim 1, wherein the small-diameter shaft portion is provided on one end side of the rotary shaft.

6. The connecting structure according to claim 1, wherein a transmission portion such as gear teeth or the like is provided on an outer periphery of the metal plate.

7. The connecting structure according to claim 1, wherein the portion around the mount hole on the metal plate has a thickness of not greater than 3 mm.

8. The connecting structure according to claim 1, wherein a height of the swaged projecting from the outer peripheral surface, ranges from 0.08 to 0.3 mm.

9. A connecting structure between a stepped rotary shaft composed of first and second small-diameter shaft portions, the first small-diameter shaft portion being connected to one end side of a large-diameter shaft portion with a predetermined difference in diameter so as to form therebetween a first shoulder surface perpendicular to an axis of the rotary shaft, and the second small-diameter shaft portion being smaller in diameter than that of the first small-diameter shaft portion and connected to one end side of the first small-diameter shaft portion with a predetermined difference in diameter so as to form therebetween a second shoulder surface perpendicular to the axis of the rotary shaft, and first and second metal plates formed with first and second circular-shaped mount holes, which are adapted to be fitted onto the first and second small-diameter shaft portions, respectively, wherein the first and second small-diameter shaft portions, respectively, are formed on outer peripheral surfaces thereof with plural axially extending stripes of first and second swaged streaks through plastic deformation by applying a load onto the outer peripheral surface, the first and second mount holes, respectively, are consecutively press-fitted onto the first and second small-diameter shaft portions so as to be subjected to plastic deformation by the first and second swaged streaks, portions surrounding the first and second mount holes on one side surfaces of the first and second metal plates are pushed against the first and second shoulder surface, respectively, and the outer peripheral surfaces of the first and second small-diameter shaft portions and the first and second mount holes, respectively, are joined together by laser welding or the like.

10. An electrically controlled throttle device, comprising a valve shaft to which a throttle valve is mounted, the value shaft having a center axis, and a throttle gear operational joined to the valve shaft so as to transmit a rotational drive force of a motor to the valve shaft, wherein the valve shaft is compressed of a large-diameter shaft portion and a small diameter shaft portion connected to each other with a predetermined difference in diameter to define therebetween a shoulder surface orthogonal to the center axis, plural stripes of swaged streaks extending in a direction of a shaft length are formed on an outer peripheral surface of the small-diameter shaft portion through plastic deformation by applying a load to the outer peripheral surface, a mount hole is formed in the throttle gear and is press-fittable onto the small-diameter shaft portion so as to be subjected to plastic deformation by the swaged streaks, the throttle gear being pushed against the shoulder surface, and the outer peripheral surface of the small-diameter shaft portion and the mount hole of the throttle gear are joined by laser welding.

11. An electrically controlled throttle device, company a valve shaft to which a throttle valve is mounted, and a driving bracket operatively joined to the valve shaft, the driving bracket being a component of a throttle sensor for detection of a throttle position wherein the valve shaft is comprised of a large-diameter shaft portion and a small diameter shaft portion connected to each other with a predetermined difference in diameter so as to define therebetween a shoulder surface orthogonal to the center axis, plural stripes of swaged streaks extending in a direction of a shaft length are formed on an outer peripheral surface of the small-diameter shaft portion through plastic deformation by applying a load to the outer peripheral surface, a mount hole is formed in the driving bracket and is press-fittable onto the small-diameter shaft portion so as to be subjected to plastic deformation by the swaged streaks, the driving bracket being pushed against the shoulder surface, and the outer peripheral surface of the small-diameter shaft portion and the mount hole of the driving bracket are joined by laser welding.

12. An electrically controlled throttle device, company a valve shaft to which a throttle valve is mounted, the valve shaft having a center axis, a throttle gear operatively joined to the valve shaft so as to transmit a rotational drive force of a motor to the valve shaft, and a driving bracket operatively joined to the valve shaft, the driving bracket being a component of a throttle sensor for detection of a throttle position, wherein the valve shaft is comprised of first and second small-diameter shaft portions, the first small-diameter shaft portion being connected to one end side of a large-diameter shaft portion with a predetermined difference in diameter so as to form therebetween a first shoulder surface perpendicular to an axis of the rotary shaft, and the second small-diameter shaft portion being smaller in diameter than that of the first small-diameter shaft portion and connected to one end side of the first small-diameter shaft portion with a predetermined difference in diameter so as to form therebetween a second shoulder surface perpendicular to the axis of the rotary shaft, and the throttle gear and the driving bracket are formed respectively therein with first and second circular-shaped mount holes, which are adapted to be fitted onto the first and second small-diameter shaft portions, respectively are formed on outer peripheral surfaces thereof with plural axially extending stripes of first and second swaged streaks through plastic deformation by applying a load onto the outer peripheral surface, the first and second mount holes are consecutively press-fittable onto the first and second small-diameter shaft portions, respectively, so as to be subjected to plastic deformation by the first and second swaged streaks, portions surrounding the first and second mount holes on one side surface of the throttle gear and the driving bracket are pushed against the first and second shoulder surface, respectively, and the outer peripheral surfaces of the first and second small-diameter shaft portions and the first and second mount holes, respectively, are joined by laser welding.

13. The electrically controlled throttle device according to claim 11, wherein the throttle sensor is either of a contact type or of a non-contact type.

14. A method of connecting between a rotary shaft having a center axis and a metal plate, comprising the steps of preparing the rotary shaft composed of a large-diameter shaft portion and a small-diameter shaft portion which are connected to each other with a predetermined difference in diameter therebetween, forming plural stripes of swaged streaks extending in a direction of shaft length on an outer peripheral surface of the small-diameter shaft portion through plastic deformation by applying a load to the outer peripheral surface, forming a mount hole, which is adapted to be fitted onto the small-diameter shaft portion, in the metal plate, press-fitting the mount hole of the metal plate onto the small-diameter shaft portion so as to subject the same to plastic deformation by the swaged streaks, pressing the material plate against the shoulder surface, and thereafter joining the outer peripheral surface of the small-diameter shaft portion and the mount hole of the metal plate together by laser welding.

15. A connecting structure according to claim 9, wherein an intermediate large-diameter shaft portion is formed between the first and second small diameter shaft portions, and has a diameter smaller than that of the first small diameter portion but larger than that of the second small diameter shaft portion.

16. A connecting structure according to claim 1, wherein the stripes of swaged streaks extend axially with a clearance between the stripes and the shoulder surface.

* * * * *